Feb. 28, 1956 A. I. BEAN 2,736,240
RELIEVING SPINDLE MECHANISM
Filed June 5, 1951 3 Sheets-Sheet 1

INVENTOR.
ARTHUR I. BEAN.
BY John Morton
HIS ATTORNEY.

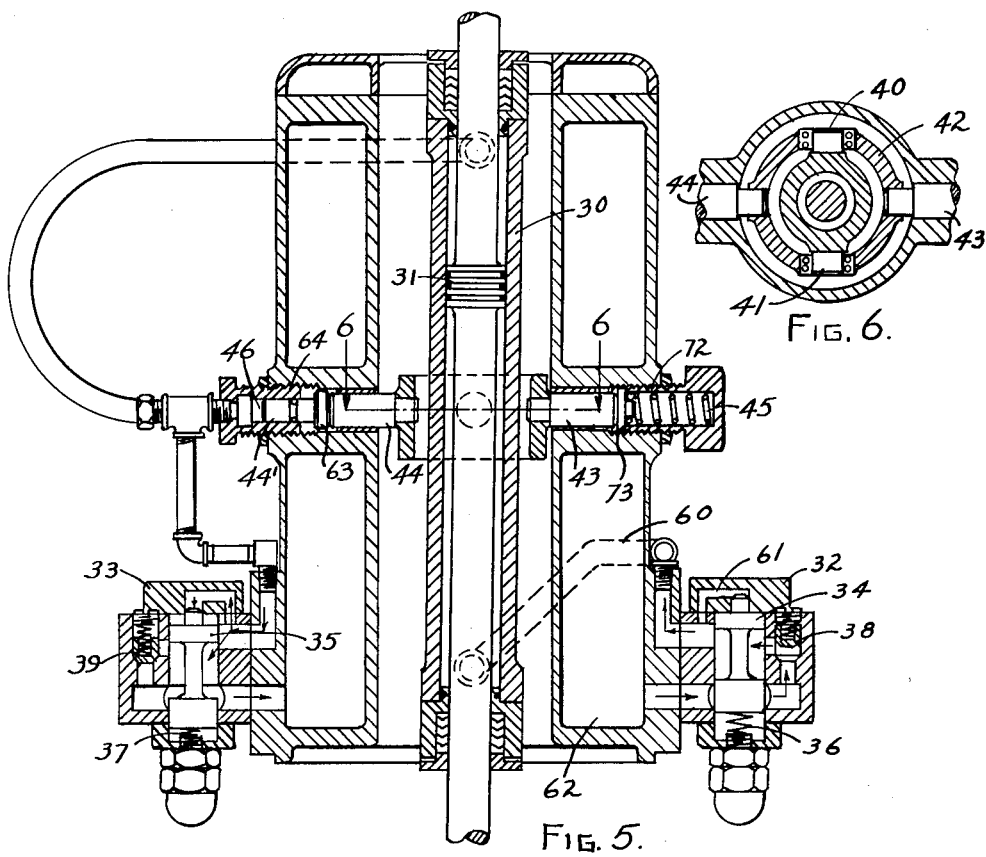
FIG. 6.
FIG. 5.
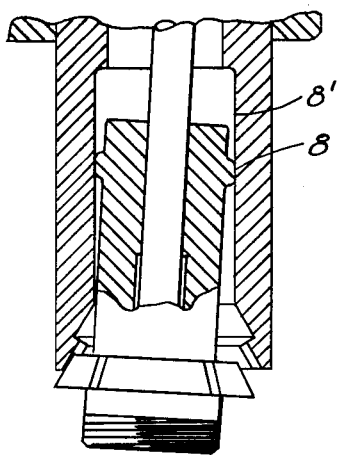
FIG. 7.
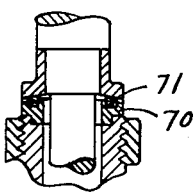
FIG. 8.
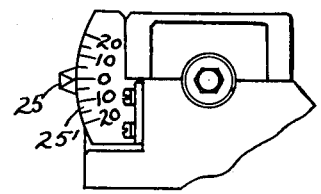
FIG. 9.
INVENTOR.
ARTHUR I. BEAN.
BY John Morton
HIS ATTORNEY.

Feb. 28, 1956 A. I. BEAN 2,736,240
RELIEVING SPINDLE MECHANISM
Filed June 5, 1951 3 Sheets-Sheet 3

INVENTOR.
ARTHUR I. BEAN
BY John Morton
HIS ATTORNEY.

United States Patent Office 2,736,240
Patented Feb. 28, 1956

2,736,240

RELIEVING SPINDLE MECHANISM

Arthur I. Bean, Springfield, Vt., assignor to The Fellows Gear Shaper Company, Springfield, Vt., a corporation of Vermont Application June 5, 1951, Serial No. 229,966

8 Claims. (Cl. 90—7)

The present invention relates to machine tools, such as gear shaping machines and the like, in which a reciprocating cutter spindle is employed. More specifically, the invention is concerned with a gear shaping machine in which teeth or similar configurations are formed on a work piece by means of a cutter which is usually conjugate to the shape to be formed on the work. This cutter is carried on a reciprocating cutter spindle which rotates in harmony with rotation given to the work piece. The present invention is concerned specifically with means for relieving the cutter so that on its non-cutting stroke it will not rub on the work piece and so mar the desired finish or shape on the work piece. It is already old and well known to relieve the cutter carrying carriage or the work carrying carriage so as to obtain the necessary relief; and in some instances, the cutter spindle itself has been relieved in the cutter carrying carriage, but there has been no positive control for this relief. The use of a cutter carrying carriage or a work carrying carriage which relieves introduces many problems due to the mass of the carriage. This is particularly true where a high-speed reciprocating spindle is necessary to obtain the required production.

The primary object of this invention is to relieve the cutter relative to the work and to control this relief positively while avoiding the objection of relieving the entire cutter carrying carriage or work carrying carriage. Another object is to control the relief positively while the cutter is being used to cut either helical or spur teeth on the work. Another object is to control the necessary relief so that either internal or external gears may be cut. Still another object is to obtain the desired relief of the cutter by means of a comparatively simple mechanism which is capable of rapid reciprocation and controlling the relief positively and rapidly so as to cut the desired shape on the work expeditiously with the maximum production.

In the accompanying drawings:

Figure 5 is an enlarged section of the hydraulic mechanism for controlling the relief of the cutter shown in a different position than that of Figure 1.

Figure 6 is a view taken along the line 6—6 in Figure 5.

Figure 7 is an enlarged view of the lower end of the cutter spindle with the cutter removed from the cutter adapter and showing the spindle in relieved position which corresponds to the position of the spindle as shown in Figure 5 with the cutter adapter shown in an exaggerated tilted position.

Figure 8 is an enlarged view of the spherical abutments which coact to control the motion of the cutter spindle carrier and cutter spindle.

Figure 9 is a partial view looking in the direction of the arrows 9—9 in Figure 2.

Like reference characters designate the same parts wherever they occur in all the figures.

Figure 1:
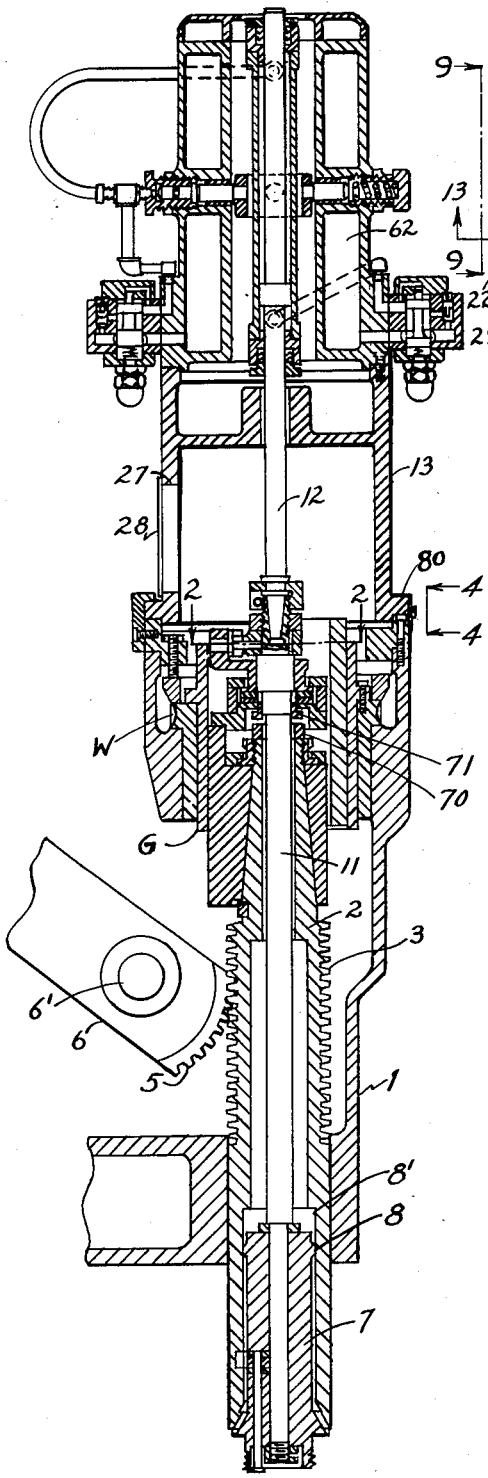
Figure 1 is a vertical cross section through the mechanism herein concerned showing the cutter spindle and the relative elements necessary to achieve the above objects.

As shown in Figure 1, a cutter spindle mounting 1 is fixed to the base of the machine tool herein concerned in juxta-position to the work carrying spindle which is not shown. Reciprocably mounted in the mounting 1 is a cutter spindle carrier 2 which has formed thereon circular rack teeth 3. These rack teeth mesh with teeth 5 formed on the reciprocating arm 6 which is pivoted at 6'. This reciprocating arm 6 is actuated in the customary gear shaper manner as shown in the patent to Fellows, No. 1,478,472, issued December 25, 1923, and upon actuation serves to reciprocate the cutter spindle carrier 2. This carrier 2 has mounted in its lower end a cutter adapter 7. This cutter adapter has a threaded lower end on which may be mounted a cutter held in position by a locking nut threaded on said lower end. As shown in Figure 1 and Figure 7, this adapter 7 has a spherical bearing surface 8 formed adjacent to its upper end which engages the cylindrical opening 8' in the cutter spindle carrier. Also formed on this adapter 7 are the teeth 9 of a clutch member shown in Figure 10. These teeth 9 mesh with corresponding teeth 10 formed on the cutter spindle carrier. When the teeth 9 and 10 are firmly engaged, the cutter is held against rotation in the cutter spindle carrier and the conformation of teeth 9 and 10 align the adapter accurately with the axis of the cutter spindle carrier 2.

The cutter spindle carrier 2 has at its upper end the usual helical guide arrangement G and worm wheel W which serves to give to the cutter spindle carrier a helical movement when the device is employed in the cutting of helical gears. If spur gears are to be formed, a helical guide is employed with an infinite lead. The worm wheel W is rotated in the customary gear shaper worm drive arrangement such as is shown in the above mentioned patent to Fellows, where in Figure 5 is shown a worm wheel 14 and a helical guide arrangement similar to that employed in the present device.

The cutter spindle 11 is mounted in the cutter spindle carrier 2 and is capable of longitudinal movement in this carrier to a limited extent. The longitudinal movement is necessary to enable the disengagement of the clutch teeth 9 from the clutch teeth 10 so as to allow the relief of the cutter. At its upper end the cutter spindle 11 is joined by a suitable mechanical connection to the piston rod 12 of a hydraulic unit 13 which is employed to impart the desired relieving movement to the cutter spindle 11.

Figure 13:
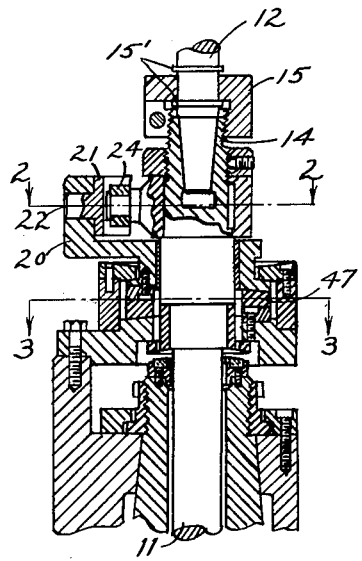
Figure 13 is an enlarged view showing the connection between the lower end of the piston rod and the upper end of the cutter spindle and showing the auxiliary guide means which controls the rotation of the cutter spindle when it is in relieved position.

The mechanical connection between the spindle 11 and the rod 12 may be of the nature shown in Figure 13 wherein the upper portion of the spindle 11 is threaded as shown at 14 and is engaged by a nut 15 which is held against longitudinal movement on the rod 12 by means of shoulders 15'. Obviously any suitable connection between the spindle 11 and the rod 12 may be employed.

In addition to the helical guide arrangement G, an auxiliary guide arrangement must be employed. Longitudinal movement must be given to the spindle 11 relative to carrier 2 to permit disengagement of the clutch teeth 9 and 10.

Figure 2:
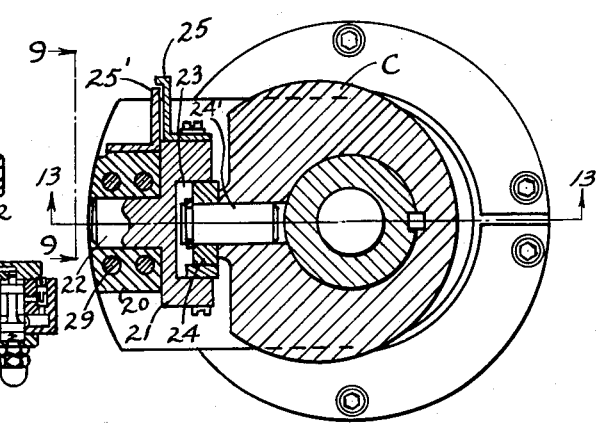
Figure 2 is a section taken along the line 2—2 in Figure 1 and Figure 13.
Figure 4:
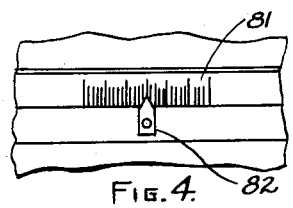
Figure 4 is an enlarged partial side view looking in the direction of the arrows 4—4 in Figure 1.

During this movement, the cutter spindle 11 must be given the necessary helical movement in the same way as is imparted to the spindle 11 and carrier 2 by the helical guide arrangement G if the cutter is to maintain its proper relation to the teeth being formed on the work. This auxiliary guide mechanism is shown in enlarged sections in Figure 2 and Figure 13. The mechanism consists of a member 20 which is held against rotative movement relative to the cutter spindle carrier 2. Mounted in this fixed member 20 is an adjustable member 21 which is pivotally mounted about a pivot 22. The member 21 has a guideway 23 therein and slideably mounted in this guideway 23 is a roller 24 which is fixed to the cutter spindle 11 by means of a pin 24' which is in turn imbedded in a collar C which is keyed to the cutter spindle as shown in Figure 2.

Mounted on the adjustable member 21 is an indicator pointer 25 which cooperates with an indicator 25' fixed to the member 20. As shown in Figure 2 and Figure 9, the indicator 25' is graduated in degrees of helix, which will show to the machine operator the amount of helix angle which will be obtained on the cutter when the member 21 is rotated about its pivot 22. In setting up the device herein concerned, the member 21 is rotated to the desired position and suitably locked in this position. In order to rotate the member 21, an opening 27 is provided in the hydraulic unit 13 which is customarily covered by plate 28. This plate 28 is removed and locking bolts 29 loosened to permit the member 21 to be rotated manually to the desired position after which the bolts 29 are tightened to hold it in the predetermined position. During rotation of the member 21, the nut N on the lower end of the cutter spindle 11 must be loosened so as to permit the relative rotation of the cutter spindle 11 in the cutter spindle adapter 7.

As has been stated above, a hydraulic unit 13 is provided to positively control the relieving movement of the cutter relative to the work. This hydraulic unit, as shown in Figure 1 and Figure 5, consists of a cylinder 30 which is suitably held as described below so as to prohibit any longitudinal movement relative to the mounting 1. Mounted in the cylinder 30 is the piston rod 12 which has formed thereon a piston 31. Two sequence valves 32 and 33 are provided, which valves control the admission of fluid to the upper and lower ends of the cylinder 30 and in so doing, these valves control the pressure on opposite sides of piston 31 in time with the motion of the piston rod 12 relative to the cylinder 30 and the cutter spindle mounting member 1. As shown in Figure 5, these sequence valves consist of spools 34 and 35 which are urged upwardly by counter-balance springs 36 and 37 and also the sequence valves 32 and 33 have check valves 38 and 39 therein.

The cylinder 30 is mounted for limited lateral movement which movement is necessary to impart the relieving movement to the cutter. As shown in Figure 5 and Figure 6, the mounting consists of pins 40 and 41 formed on the cylinder 30, and these pins are journaled in a trunnion member 42. Lateral movement is given to the trunnion member by plungers 43 and 44 as is clearly shown in Figure 5. The plunger 43 is urged to the left as shown in Figure 5 by a spring member 45. The plunger 44 is urged to the right as shown in Figure 5 when fluid is admitted to the cylinder 46 which fluid will act upon the reduced end 44' of the plunger 44.

Since the piston rod 12 and the cutter spindle 11 are rigidly joined by the mechanical connection described above, some means must be provided to permit lateral movement between the piston rod 12 and cutter spindle 11 and the cutter spindle carrier 2.

Figure 3:
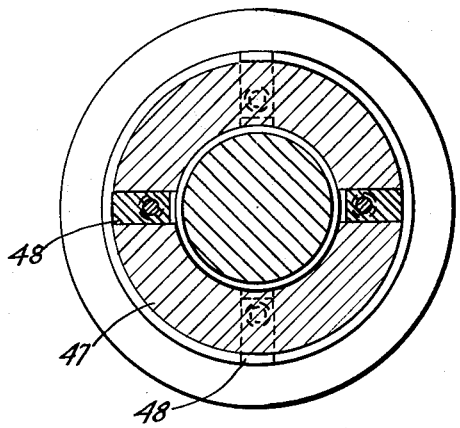
Figure 3 is a partial section along the line 3—3 of Figure 13.

This movement may be provided for by using a customary commercial type coupling modified so as to provide spherical seats between the spindle 11 and the carrier 2 and which is shown at 47 in Figure 13 and which is shown in cross section in Figure 3. This coupling has a plurality of keys 48 which permit lateral movement of one-half of the coupling relative to the other while still maintaining rotative driving arrangement between cutter spindle 11 and the cutter spindle carrier 2.

Figure 11:
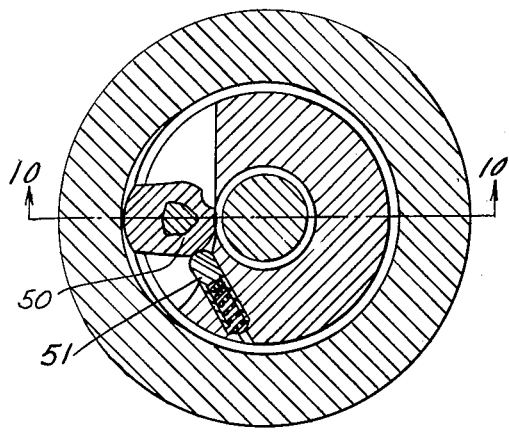
Figure 11 is a cross section along the line 11—11 of Figure 10.
Figure 10:
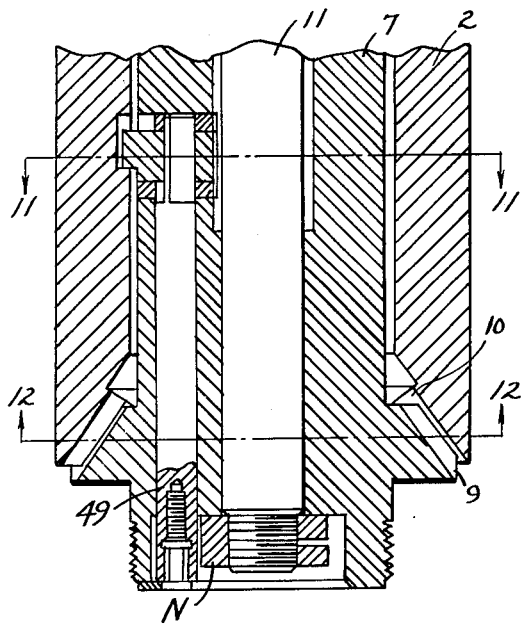
Figure 10 is an enlarged view of the lower end of the cutter spindle and cutter spindle carrier showing the clutch arrangement which holds the cutter concentrically, and also showing the means for locking the cutter spindle adapter against rotation in the cutter spindle carrier.
Figure 12:
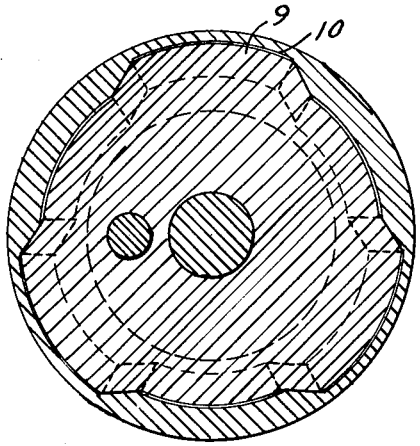
Figure 12 is a section taken along the line 12—12 in the direction of the arrow in Figure 10.

Some means must be provided to hold the cutter spindle carrier 2 firmly in position in the mounting member 1 when it is desired to replace the cutter on the threaded end of the cutter spindle carrier 2. This means is shown in Figure 10 and Figure 11. A rotatable member 49 is journaled in the carrier 2 and has fixed to its upper end and firmly held against relative rotation thereto a cam member 50 which when rotated will securely hold the carrier member 2 against rotation relative to the mounting member 1. A locking detent 51 is employed to hold the cam member 50 against rotation when the machine is in operation. This locking detent may be spring-urged into engagement with the cam member 50.

The operation of the device is as follows:

As the cutter spindle carrier 2 is reciprocated downward in response to the motion of the reciprocating arm 6, the member 7 is held firmly in position with respect to the carrier 2 by means of the hydraulic unit in cooperation with the clutch teeth 9 and 10 which hold the cutter spindle carrier 2 and the cutter spindle 11 against any relative rotation. In the present embodiment, the teeth are being formed on the work during the downward movement of the cutter spindle. As shown in Figure 1, the cutter spindle carrier has practically reached the lower limit of its movement.

During the downward movement the piston 31 has increased the pressure in the cylinder 30 on the lower side which pressure has been communicated to the top of the spool 34 through the connection 60 and the port 61. In the position shown in Figure 1, pressure has been increased to such an extent on the top of the spool 34 that it is sufficient to overcome the counter-balance spring 36, and when this occurs oil will flow through the sequence valve 32 to the tank 62. When the piston rod 12 and piston 31 reach the lower limit of their downward movement the counter-balance spring 36 will force the spool member 34 to its upper limit and cut off the flow of any fluid from the cylinder 30 to the tank 62.

During the motion of the piston 31 downwardly, the pressure on the upper side of the piston 31 has been continually decreased in the cylinder 30 and this decrease in pressure causes the flow of oil from the tank 62 through the sequence valve 33 to the top of the cylinder. As will be apparent from Figure 1, when the fluid is flowing in this direction it acts against the check valve 39 to open this check valve to permit the fluid to pass through the sequence valve about the spool 35. During the down stroke of the cutter spindle 11, the spring 45 holds the trunnion 42 in which is mounted the cylinder 30 firmly to the left as shown in Figure 1. On the plunger 44 is formed collar member 63 which coacts with a threaded stop member 64 to limit the leftward movement of the trunnion and correspondingly the cylinder 30. Since the pressure on the upper side of the piston 31 has been reduced due to the downward movement of the cutter spindle, the spring 45 is sufficient to hold the collar member 63 firmly in engagement with the stop member 64 during the cutting operation.

When the motion of the cutter spindle carrier 2 is reversed through the reciprocating arm 6, the piston rod 12 will remain momentarily stationary and the oil locked underneath the piston in the cylinder 30. It will remain in this position until a spherical abutment 70 on the cutter spindle carrier 2 engages a complimental spherical seat 71 on the cutter spindle held against longitudinal movement. Since the members 70 and 71 are engaged, the piston rod 12 and cutter spindle 11 will move upwardly at which time pressure will be built up on the upper side of piston 31. When the pressure increases in the upper portion of the cylinder 30, it will be admitted to the cylinder 46 and force the trunnion member 42 to the right as shown in Figure 5 against the force of the spring 45. A stop member 72 which is similar to the stop member 64 is provided to limit the motion of the trunnion member 42. This stop member 72 cooperates with the abutment 73 adjacent to plunger 43. The stop members 64 and 72 may be rotated to adjust the amount of movement of the trunnion member 42.

During the upward movement of the piston 31, the pressure on the lower side of the piston is decreased and oil will flow from the tank 62 through the sequence valve 32 in the direction of the arrows shown in Figure 5. The fluid will continue to flow in the direction shown until the piston 31 reaches the upper limit of its stroke.

When the cutter spindle carrier 2 starts its upward movement, the clutch teeth 9 and 10 are disengaged since the cutter spindle 11 has remained suspended along with the piston rod 12 as described above. After the disengagement of the clutch teeth 9 and 10, the trunnion member 42 will be moved under the impulse of the fluid admitted to the cylinder 46 and the piston rod 12, cutter spindle 11 and cutter adapter 7 have been pivoted about spherical bearing 8 so as to relieve the cutter engagement with the work.

The cutter is held in the relieved position during the upward movement of the unit as described above.

When the cutter spindle carrier 2 begins its downward movement, the piston rod 12 will be held by the oil on the lower side of the piston 30 until clutch teeth 9 and 10 start to engage. On continued downward movement of the cutter spindle carrier 2 the pressure below the piston 31 will continue to increase so as to hold the clutch teeth 9 and 10 firmly in position. Upon downward movement of the piston 31, the pressure on the upper side of the piston will be decreased as described above and the spring 45 will lead the trunnion 42 to its adjusted position which will be coaxial with the cutter spindle carrier 2.

When gears of different helix angles are being cut, it is necessary to rotatably adjust the direction of relieving movement and this is done by making the unit 13 adjustable on the mounting member 1. As shown in Figure 1, a flange 80 is formed on the member 13 which abuts a bearing surface on the member and which may be bolted thereto in the obvious manner. A scale 81 is formed on the flange 80 which cooperates with a pointer 82 on the member which indicates various positions of angular adjustment.

What I claim is:

1. In a gear shaper, a mounting member, a reciprocating cutter spindle carrier mounted in said member, a cutter spindle mounted coaxially in said spindle carrier, means on said spindle to attach a cutter thereto, means to hold said spindle against rotation in said carrier, means operable to engage and disengage said holding means in response to reciprocation of said carrier and spindle, guide means to control the rotation of said spindle carrier and said spindle and supplementary guide means to control the rotation of said spindle with respect to said carrier when said holding means become disengaged.

2. In a gear shaper, a mounting member, a reciprocating cutter spindle carrier mounted on said member, a cutter spindle mounted coaxially in said spindle carrier, means on said spindle to attach a cutter thereto, means to hold said spindle against rotation in said carrier, means operable to engage and disengage said holding means, guide means to control the rotation of said spindle carrier and said spindle, supplementary guide means to control the rotation of said spindle with respect to said carrier and means to move said cutter spindle laterally thereof with respect to said carrier when said holding means is disengaged.

3. In a gear shaper, a mounting member, a reciprocating cutter spindle carrier mounted on said member, a cutter spindle mounted coaxially in said spindle carrier, means on said spindle to attach a cutter thereto, means to hold said spindle against rotation in said carrier, means operable to engage and disengage said holding means in response to reciprocation of said carrier and spindle, guide means to control the rotation of said spindle carrier and said spindle, supplementary guide means to control the rotation of said spindle with respect to said carrier and means to move said cutter spindle laterally thereof with respect to said carrier when said holding means is disengaged.

4. In a machine of the character described, a mounting member, a spindle carrier mounted to reciprocate in said mounting member, a spindle mounted in said spindle carrier, means to reciprocate said spindle carrier and said spindle, means to rotate said spindle and spindle carrier, guide means to impart a secondary rotation to said spindle carrier and said spindle, a supplementary guide means adapted to control the rotation of the spindle with respect to the spindle carrier and a coupling between said spindle carrier and said spindle so shaped as to allow lateral movement of said spindle with respect to said spindle carrier.

5. In a machine of the character described, a spindle mounting, a spindle carrier mounted to reciprocate in said mounting, means to reciprocate said spindle carrier, a spindle mounted in said carrier, securing means adapted to hold said carrier and spindle against relative rotation, means operable to engage and disengage said securing means, means to rotate said spindle carrier, guide means to impart a helical movement to said spindle carrier and supplementary guide means to impart an added helical movement to said spindle when said securing means is disengaged said supplementary guide means consisting of an adjustable guide on said spindle carrier and a complementary bearing member fixed to said spindle and coacting with said adjustable guide.

6. In a machine of the character described, a mounting member, a spindle carrier adapted to reciprocate in said mounting member, a spindle mounted in said carrier, clutch means to hold said spindle against rotation in said carrier, means responsive to reciprocation of said spindle and carrier to engage and disengage said clutch means, guide means to impart a rotative movement to said spindle carrier and an additional guide means to control the rotatable position of said spindle with respect to said carrier when said clutch means is disengaged said additional guide means consisting of an adjustable guide on said spindle carrier having a complementary bearing member fixed to said spindle and co-acting with said adjustable guide.

7. In a gear shaper, a mounting member, a reciprocating cutter spindle carrier mounted in said member, a spindle mounted coaxially in said spindle carrier, means to hold said spindle against rotation in said carrier, means operable to engage and disengage said holding means in response to reciprocation of said carrier and spindle, guide means to control the rotation of said spindle carrier and said spindle, supplementary guide means to control the rotation of said spindle with respect to said carrier when said holding means become disengaged, said engaging and disengaging means consisting of a cylinder, a piston in said cylinder joined to said spindle, sequence valves controlling the admission of fluid to opposite sides of said piston, said sequence valves being operable by the reciprocation of said spindle and means operable to move said cylinder laterally in time with the operation of said engaging and disengaging means.

8. In a gear shaper, a mounting member, a reciprocating cutter spindle carrier mounted in said member, a spindle mounted coaxially in said spindle carrier, means to hold said spindle against rotation in said carrier, means operable to engage and disengage said holding means in response to reciprocation of said carrier and spindle, guide means to control the rotation of said spindle carrier and said spindle, supplementary guide means to control the rotation of said spindle with respect to said carrier when said holding means become disengaged, said engaging and disengaging means consisting of a cylinder, a piston in said cylinder joined to said spindle, sequence valves controlling the admission of fluid to opposite sides of said piston, said sequence valves being operable by the reciprocation of said spindle, means operable to move said cylinder laterally in time with the operation of said engaging and disengaging means and a coupling between said spindle and spindle carrier so shaped as to allow lateral movement of said spindle with respect to said spindle carrier.

References Cited in the file of this patent

UNITED STATES PATENTS

| | | |
|---|---|---|
| 1,820,409 | Trbojevich | Aug. 25, 1931 |
| 1,961,129 | Haas et al. | June 5, 1934 |
| 2,125,304 | Miller | Aug. 2, 1938 |
| 2,129,858 | Miller | Sept. 13, 1938 |

OTHER REFERENCES

Ser. No. 392,532, Fredericks (A. P. C.), published May 4, 1943.